United States Patent
Borden, IV et al.

(10) Patent No.: US 7,432,990 B2
(45) Date of Patent: Oct. 7, 2008

(54) OPEN AQUOS REMOTE CONTROL UNIQUE BUTTONS/FEATURES

(75) Inventors: George Rome Borden, IV, Vancouver, WA (US); Bryan S. Hallberg, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 700 days.

(21) Appl. No.: 10/961,444

(22) Filed: Oct. 7, 2004

(65) Prior Publication Data

US 2005/0166254 A1 Jul. 28, 2005

Related U.S. Application Data

(60) Provisional application No. 60/535,157, filed on Jan. 6, 2004.

(51) Int. Cl.
H04N 5/44 (2006.01)
(52) U.S. Cl. .................. 348/734; 348/725; 348/552

(58) Field of Classification Search .......... 348/734, 348/725, 522; 725/37, 131, 132, 151–152, 725/134; 715/765, 719, 864; H04N 5/44
See application file for complete search history.

(56) References Cited

U.S. PATENT DOCUMENTS

| | | | |
|---|---|---|---|
| 5,477,264 A * | 12/1995 | Sarbadhikari et al. | 348/231.6 |
| 5,936,679 A | 8/1999 | Kasahara et al. | 348/553 |
| 6,021,185 A | 2/2000 | Staron | 379/93.17 |
| 6,141,058 A | 10/2000 | Lagoni et al. | 348/563 |
| 6,543,052 B1 * | 4/2003 | Ogasawara | 725/60 |
| 6,636,272 B1 * | 10/2003 | Noguchi et al. | 348/734 |
| 6,978,424 B2 * | 12/2005 | Safadi | 715/765 |
| 7,024,051 B2 * | 4/2006 | Miller et al. | 382/263 |
| 2004/0227859 A1* | 11/2004 | Liang | 348/734 |
| 2005/0076388 A1* | 4/2005 | Morse et al. | 725/131 |

* cited by examiner

Primary Examiner—Trang U Tran
(74) Attorney, Agent, or Firm—Marger Johnson & McCollom, P.C.

(57) ABSTRACT

The current invention describes novel remote control features operative with a television system, including hotkey buttons assignable to certain applications operating and/or displayed on the television system, one touch record and image capture to a removable storage medium, and notification alert buttons for browsing between certain notifications and alerts.

16 Claims, 5 Drawing Sheets

OPEN AQUOS REMOTE CONTROL UNIQUE BUTTONS/FEATURES

CROSS-REFERENCES TO RELATED APPLICATIONS

This application claims the benefit from U.S. Provisional Patent Application No. 60/535,157 filed Jan. 6, 2004 whose contents are incorporated herein for all purposes.

BACKGROUND OF THE INVENTION

1. Field of the Invention

The invention relates to remote control devices, and more particularly to such devices operative with television display systems for implementing novel features and functions.

2. Description of the Prior Art

Remote control devices for televisions have evolved from simple three function controls (on/off, channel up/down, and volume up/down) to more complex devices controlling a variety of functions of the television. But as television systems become more complex, remote controls need to be developed which allow users to access the advanced functionality of these futuristic sets.

Accordingly, the need remains for a remote control that includes unique buttons and features operative with advanced television systems.

SUMMARY OF THE INVENTION

The current invention describes novel remote control features operative with a television system, including hotkey buttons assignable to certain applications or application functions operating and/or displayed on the television system, one touch record and image capture to a removable storage medium, and notification alert buttons for browsing between certain notifications and alerts.

The foregoing and other objects, features and advantages of the invention will become more readily apparent from the following detailed description of a preferred embodiment of the invention that proceeds with reference to the accompanying drawings.

DETAILED DESCRIPTION

Figure 1:
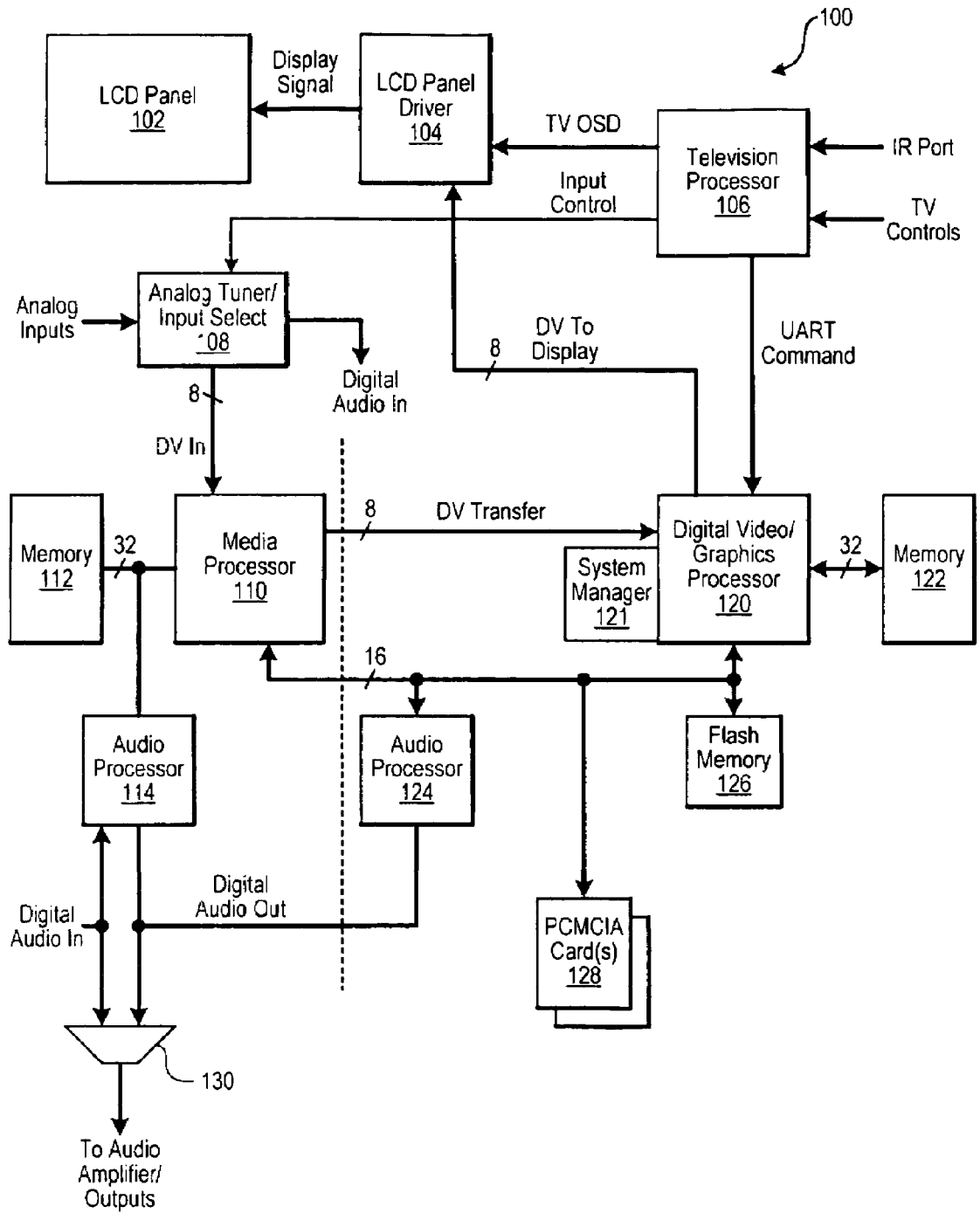
FIG. 1 is a block diagram implementation of the television system operative with the remote control of FIG. 2 to implement the present invention.

FIG. 1 contains a block diagram for a Liquid Crystal Display (LCD) television capable of operating according to some embodiments of the present invention. Television 100 contains an LCD panel 102 to display visual output to a viewer based on a display signal generated by an LCD panel driver 104. LCD panel driver 104 accepts a primary digital video signal in CCIR656 format (eight bits per pixel $YC_bC_r$, in a "4:2:2" data ratio wherein two $C_b$ and two $C_r$ pixels are supplied for every four luminance pixels) from a digital video/graphics processor 120.

A television processor 106 provides basic control functions and viewer input interfaces for television 100. Television processor 106 receives viewer commands, both from buttons located on the television itself (TV controls) and from a handheld remote control unit (not shown in FIG. 5, but like remote 200) through the IR Port. Based on the viewer commands, television processor 106 controls an analog tuner/input select section 108, and also supplies user inputs to a digital video/graphics processor 120 over a Universal Asynchronous Receiver/Transmitter (UART) command channel. Television processor 106 is also capable of generating basic On-Screen Display (OSD) graphics, e.g., indicating which input is selected, the current audio volume setting, etc. Television processor 106 supplies these OSD graphics as a TV OSD signal to LCD panel driver 104 for overlay on the display signal.

Analog tuner/input select section 108 allows television 100 to switch between various analog (or possibly digital) inputs for both video and audio. Video inputs can include a radio frequency (RF) signal carrying broadcast television, digital television, and/or high-definition television signals, NTSC video, S-Video, and/or RGB component video inputs, although various embodiments may not accept each of these signal types or may accept signals in other formats (such as PAL). The selected video input is converted to a digital data stream, DV In, in CCIR656 format and supplied to a media processor 110.

Analog tuner/input select section 108 also selects an audio source, digitizes that source if necessary, and supplies that digitized source as Digital Audio In to an Audio Processor 114 and a multiplexer 130. The audio source can be selected—independent of the current video source—as the audio channel(s) of a currently tuned RF television signal, stereophonic or monophonic audio connected to television 100 by audio jacks corresponding to a video input, or an internal microphone.

Media processor 110 and digital video/graphics processor 120 provide various digital feature capabilities for television 100, as will be explained further in the specific embodiments below. In some embodiments, processors 110 and 120 can be TMS320DM270 signal processors, available from Texas Instruments, Inc., Dallas, Tex. Digital video/graphics processor 120 functions as a master processor, and media processor 110 functions as a slave processor. Digital video/graphics processor 120 includes the system manager 121, which will be explained in further detail below. Media processor 110 supplies digital video, either corresponding to DV In or to a decoded media stream from another source, to digital video/graphics processor 120 over a DV transfer bus.

Media processor 110 performs MPEG (Motion Picture Expert Group) coding and decoding of digital media streams for television 100, as instructed by digital video/graphics processor 120. A 32-bit-wide data bus connects memory 112, e.g., two 16-bit-wide×1M synchronous DRAM devices connected in parallel, to processor 110. An audio processor 114 also connects to this data bus to provide audio coding and decoding for media streams handled by media processor 110.

Digital video/graphics processor 120 coordinates (and/or implements) many of the digital features of television 100. A 32-bit-wide data bus connects memory 122, e.g., two 16-bit-wide×1M synchronous DRAM devices connected in parallel, to processor 120. A 16-bit-wide system bus connects processor 120 to media processor 110, an audio processor 124, flash memory 126, and removable PCMCIA cards 128. Flash memory 126 stores boot code, configuration data, executable code, and Java code for graphics applications, etc. PCMCIA cards 128 can provide extended media and/or application capability. Digital video/graphics processor 120 can pass data from the DV Transfer bus to LCD panel driver 104 as is, but processor 120 can also supercede, modify, or superimpose the DV Transfer signal with other content.

Multiplexer 130 provides audio output to the television amplifier and line outputs (not shown) from one of three sources. The first source is the current Digital Audio In stream from analog tuner/input select section 108. The second and third sources are the Digital Audio Outputs of audio processors 114 and 124. These two outputs are tied to the same input of multiplexer 130, since each audio processor is capable of tri-stating its output when it is not selected. In some embodiments, processors 114 and 124 can be TMS320VC5416 signal processors, available from Texas Instruments, Inc., Dallas, Tex.

The system is a dual processor ARM arrangement with the SystemManager running on both processors in a master/slave relationship, and the ApplicationManager running in the single JMV (Java Virtual Machine) on the Digital Video/Graphics Processor (master) ARM.

The System Manager is the portion of the C program responsible for launching all of the system tasks, including the codecs, the Java engine, and the Java Manager. The Java Manager engine executes the Java class code. The Java classes may be just in time compile, interpreted, precompiled, or of some other form.

The Java Manager is the only Java application running in the system. The system may have multiple Applets, but only one Java application. The Java Manager, in the present system, contains the Application Manager (disclosed in this patent) and the Alert Manager and Hot Key Manager (disclosed in other documents). Each of these managers are classes which are part of the Java Manager. They are not separate Applets.

The Application Manager is the class which locates all the available Java Applets, and displays the selections to the user on the GUI. When the user selects an Applet to run, the Application Manager calls the Java engine to launch the Applet.

In digital video/graphics processor 120, the system manager 121 is responsible for the basic operation of television 100, including locating and extracting the various applet files upon user request as described in more detail below. The applets may be stored for retrieval by the system manager 121 in various memory systems of television 100, including memory 112 and 122, or on PCMCIA cards 128.

Figure 2:
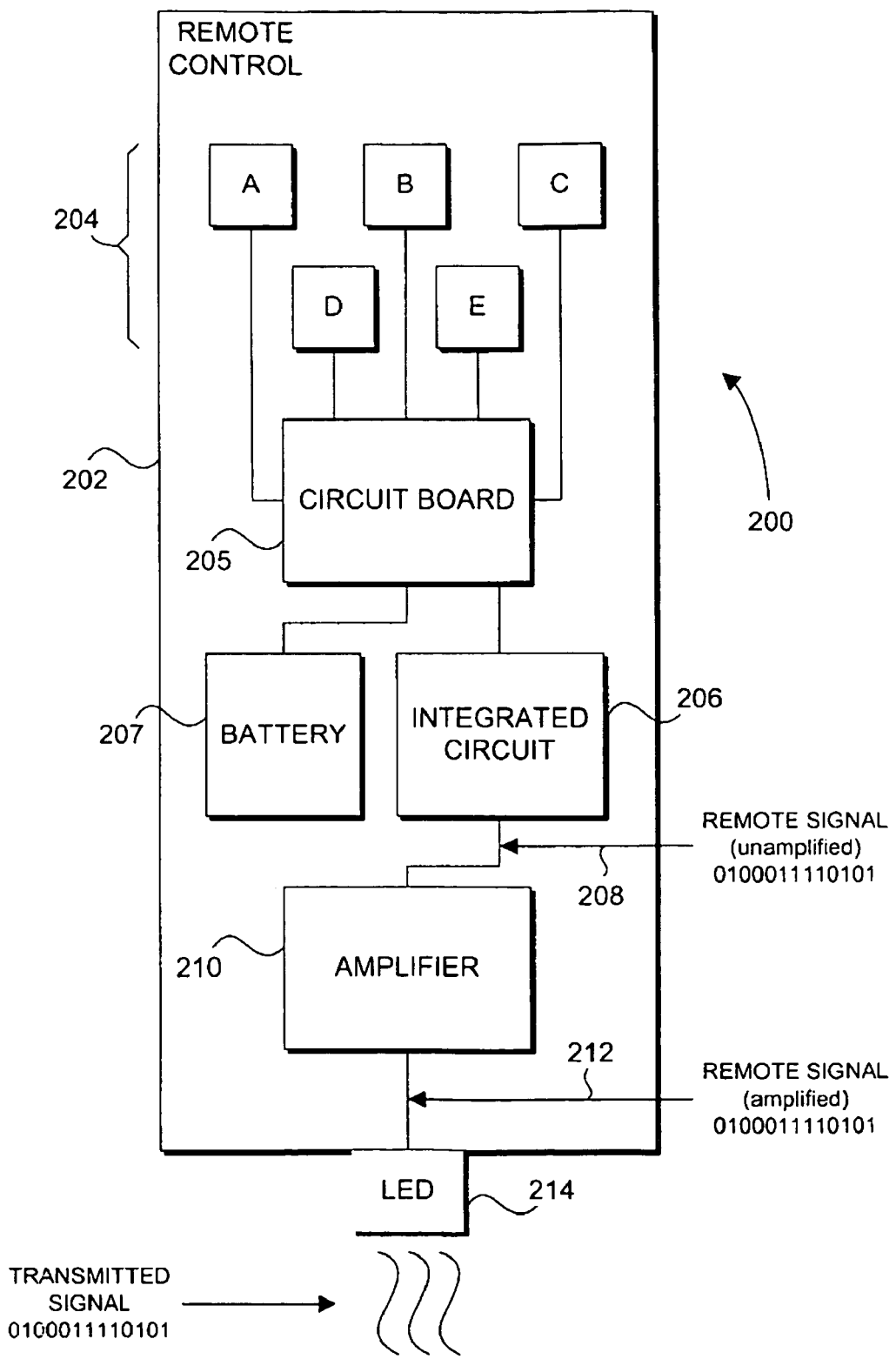
FIG. 2 is a block diagram showing operation of a remote control according to the invention.

FIG. 2 shows a block diagram of the functional components of a remote control 200 operative with the television system 100 shown in FIG. 1. The remote control in FIG. 2 includes a housing 202, buttons 204 (denoted by buttons A, B, C, D, and E) formed through the housing with lower surfaces adapted to make electrical contact to complete a circuit on a circuit board 205 positioned beneath the buttons within the housing. When the viewer presses a button on the remote control this completes a specific connection with battery 207. An IC 206 chip located on the circuit board senses that connection and knows what button was pressed. The IC chip then produces a signal 208 formed of a series of binary pulses specific to that button. That signal is amplified by transistors 210 within the housing and the amplified signal 212 is sent to an infrared LED 214, which translates the signal into infrared light. The sensor in the TV can see the infrared light and "seeing" the signal reacts appropriately by looking up the code of the signal received and comparing it to a table stored in a memory of the television system indicating which local or non-local function corresponds with the signal received.

Figure 3:
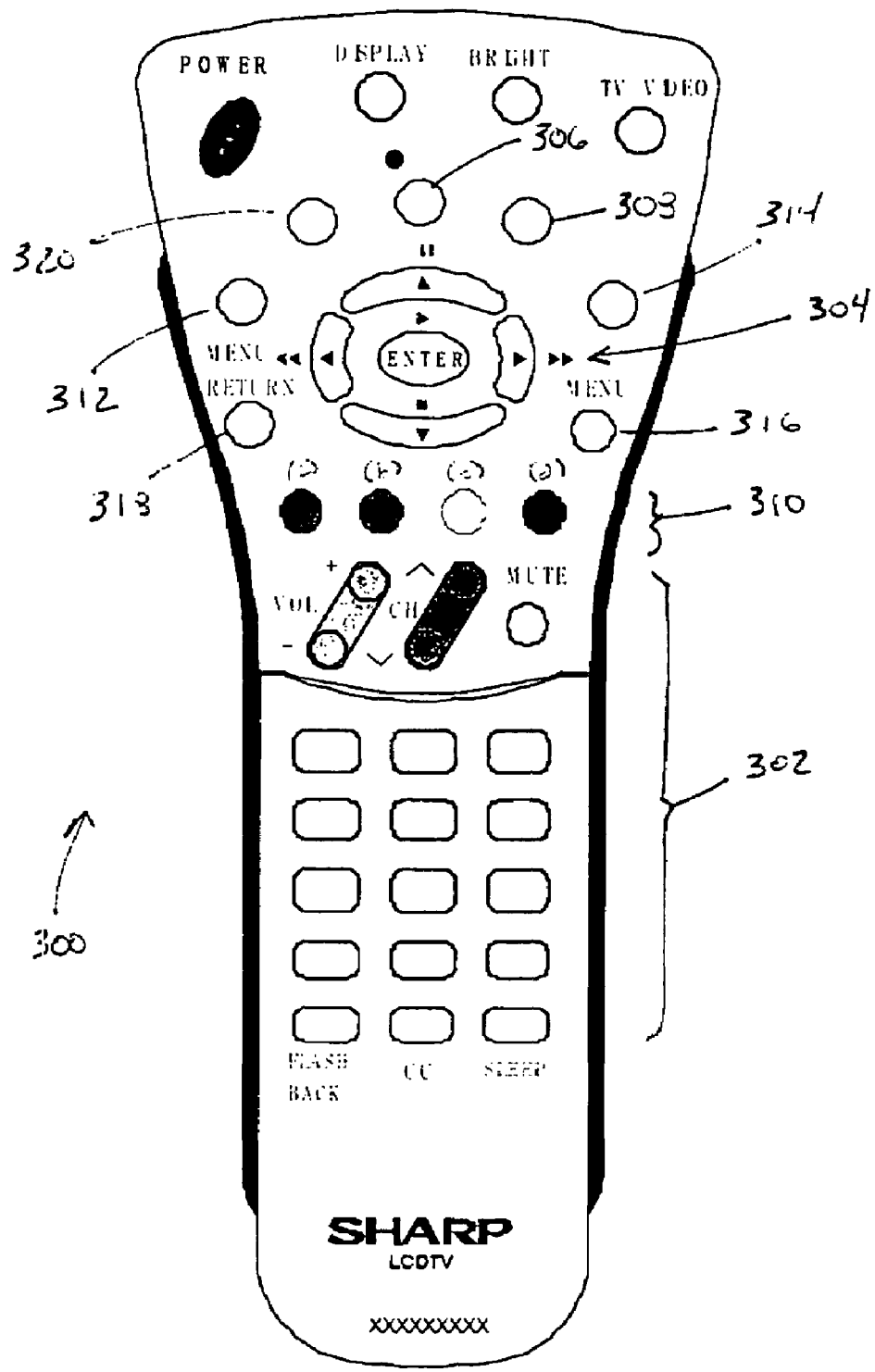
FIG. 3 is a schematic diagram of a preferred remote control device used with the display of FIG. 1.

FIG. 3 shows one embodiment of a remote control 300 used to implement the invention. The remote control in FIG. 2 includes many local-function buttons 302, examples of which are the number keys 0-9, the volume up/down button, and the channel up/down button. The remote control further has plurality of non-local function keys and cursor buttons 304 (up, down, right, left, enter) to browse through on-screen displays as described further below. Each key, when depressed, activates a wireless signal (here an infrared signal) to be transmitted from the remote control. Each button activates a unique series binary code that is transmitted by way of the wireless signal. The television display includes a wireless receiver ("IR Port" in FIG. 1) and interpreter which compares the signal with a table of functions and matches the signal received with the function requested. The requested function (e.g. raise or lower volume) is then carried out (as by routing more or less power to the speaker amplifiers). Such functions are well known in the art and not described further.

Certain keys of the remote control may be assigned certain functions. In the example described below, colored keys 310 are assigned (or re-assigned) certain program functions using a hotkey activator button 312. These colored keys 310 are also referred to as "hotkeys" because, and according to methods of the invention, they each trigger operation of certain programs that have been associated with the button (or more precisely, the remote control signal triggered by pressing the hotkey button).

Hot keys 310 are assigned to a particular function by first navigating to that function using whatever method is normally used to access the function, then pressing the <Hotkey> button 312 to request a hot key assignment, and then pressing the desired hot key to which the function will be assigned. The table of wireless signals received and functions performed that is stored at the television is updated to point to the new function. Any previous function which was already assigned to that button will no longer be assigned to the button. Only one function can be assigned to any one button, however, more than one button can have the same function assigned to it.

Figure 4:
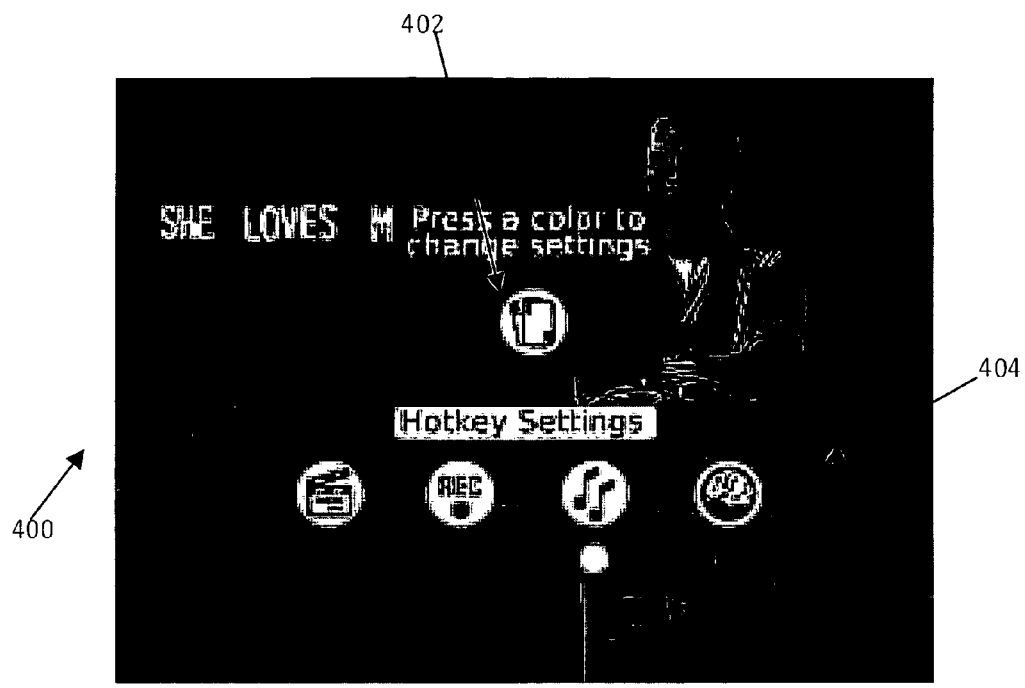
FIG. 4 is a screen shot showing one aspect of the invention using the remote control of FIG. 3.

Hot keys are assigned to start a program via the Application Manager GUI (AMGUI). To assign a function, the user first enters the AMGUI by pressing the <[Apps]> button 314, then navigates to the desired program's icon and presses the <Hotkey> button 312. After pressing the <Hotkey> button, the hot key button screen 400 appears, as shown in FIG. 4. The screen shows the icon 402 for the program currently being assigned to a hot key near the top of the screen. The current hot key assignment icons 404 are shown lower on the screen, with each hot key's currently assigned program or function icon displayed above a bar the color of the icon's assigned hot key. The user assigns the new program to a hot key by pressing the desired colored hot key 310—red, green, yellow, or blue. The user can press <Hotkey> button 312 to leave the hot key screen of FIG. 4, or any other OA key that brings up a different screen, i.e. <[Apps]> 314, <Menu> 316, or <Return> 318. After pressing the desired hot key 310, the hot key screen disappears and the function is now assigned to the pressed hot key signal.

Hot keys are assigned to program functions similarly to the method used to assign them to programs. The user navigates through the desired program and highlights the desired function. The user then presses the <Hotkey> button 312 and assigns the hot key 310 as described in the previous paragraph. If a program does not support a hot key for the desired function, a message is displayed on display 100 stating "Hot Key Not Supported", to inform the user that the desired function does not support hot keys.

Some hot key applications may be associated with certain pre-set buttons on the remote control 300. Two examples of these are record button 306 and the still image capture button 308. Pressing the record button 306 causes the video signal from media processor 110, such as a television station to which the television system 100 is currently tuned using tuner 108, to be recorded on PCMCIA cards 128 for storage and later playback. This is useful for immediate recording where the viewer is watching television, for instance, and an important moment appears only briefly on the screen. Ordinarily it would require several steps to cause recording, for which the delay may cause the viewer to miss the event. One button recording is thus a useful feature of the invention.

Pressing the capture button 308 causes the current video image from media processor to be captured on PCMCIA cards 128 for storage and later playback in a manner similar to the video images described above. The captured still images would be stored in an appropriate file format, such as .jpg, and ordered within certain media categories for later playback.

The present implementation loads a JPEG Encoder program onto the MP processor 110 and encodes a JPEG of the current live TV. This means if the broadcast content displayed on the television is already time shifted (e.g. by buffering a certain amount of broadcast content prior to playback), the processor removes the time shift and the processor reverts to Live TV to capture the image (the image will be from the live TV.)

An alternate potential embodiment would freeze the frame and save it to a buffer, load the JPEG encoder onto the DVGP processor 120 while continuing to encode MPGE4 on the MP processor 110. Once encoding was complete the MPEG4 decoder could be loaded back onto the processor 120 and decoding of the MPEG4 stream would resume from the frozen frame.

The remote control device of FIG. 3 further includes a dedicated <Alert> button 320 responsible for bringing up a notification manager program operable on television system 100. Such notifications or alerts would be caused by the TV processor, system manager, Java manager, an integrated computer, or remote computer (in communicate with a remote computer, as via an 802.11 wireless network) operative with the television system 100. For remote systems, a preferred embodiment includes a wireless PCMCIA card inserted into one of two of PCMCIA slots 128 [FIG. 1]. This hardware is then exercised by an IEEE compliant 802.11 driver in the DVG processor 120 [FIG. 1]. The communication protocol is TCP/IP.

A problem arises when a software applications (source) wishes to communicate important messages, herein called "notifications", to the viewer while they are engaged in viewing the television broadcast content or operating an application. Examples of these notifications are appointment reminders; signals from devices such as caller ID codes with telephones, weather warnings, etc.

In a preferred implementation of the alert/notification manager, detection of the <Alert> button 320 activation causes a notification screen to appear with one or more notifications listed. The user browses between the displayed list of notifications using the navigation buttons 204 on remote control 300, selecting the alert for display by highlighting the alert and pressing the enter key on the remote.

In an alternate implementation of the alert/notification manager, provided that the hot key button assign functions described above are not implemented, incoming alerts/notifications are stored in a list in memory 122 and the most recent can be mapped to the colored buttons 310 of remote control 300. Since at any given time, there may be more notifications than colored buttons 310, one of the buttons 310a, 310b, 310c or 310d is then reserved for navigating through the notification list. In the alternative, all buttons 310 can be used and a dedicated alert scroll button 304 may be used in place of one of the colored buttons 310. Should a new notification arrive while navigating through the list, the most recent notifications are again mapped to the colored buttons, and their accompanying icons redisplayed. In one arrangement, the buttons are mapped left to right so that the most recent notification is mapped to the leftmost (red button 310a) to reflect an English speaker's propensity to read from left to right.

Figure 5:
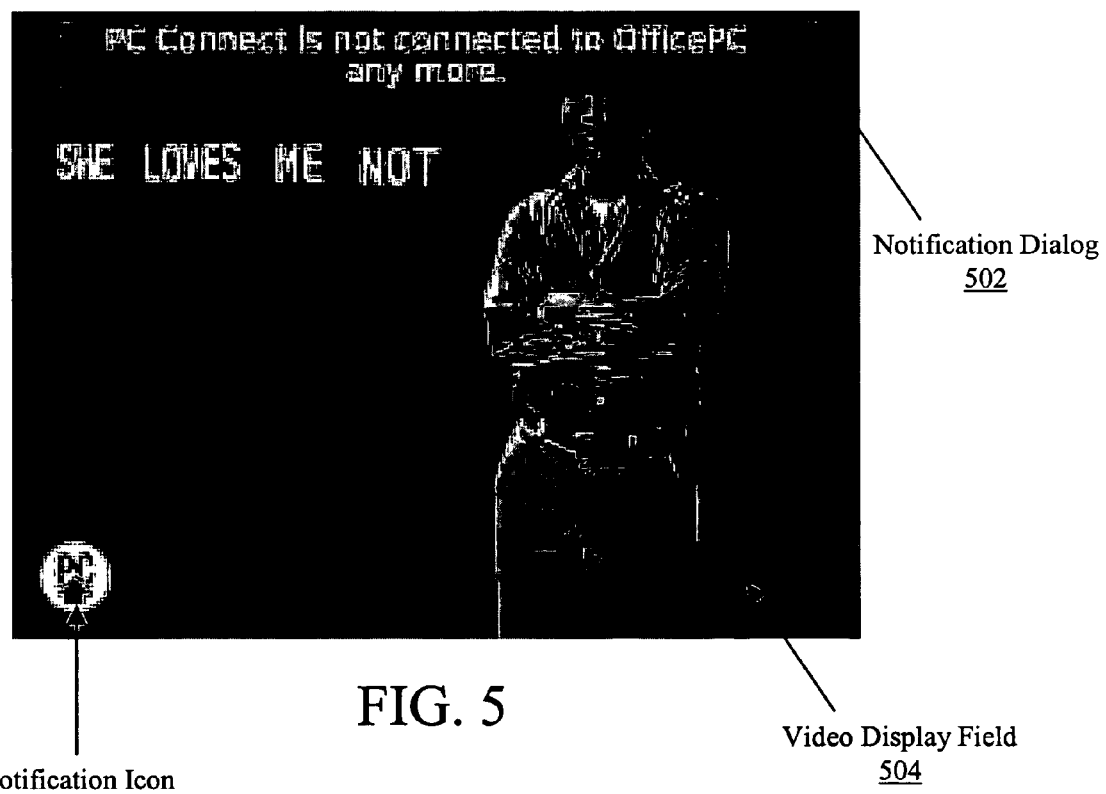
FIG. 5 is representative of a screen image showing a user interface implemented according to another aspect of the present invention.

FIG. 5 illustrates a screen shot showing a notification icon 500 mapped to the blue color button 310d. The icon is displayed in a blue color to indicate the color of the alert button (here the blue button 310d) to which the icon has been mapped. The icon appears as a small graphic at the corner along the bottom of the screen so as not to unduly interfere with the material currently being displayed on the video display field 504. If the blue button is pressed by the user, a notification dialog 502 corresponding to the icon is displayed on the screen.

Figure 6A:
FIGS. 6A-D show icons representative of different alerts used for the notification system activated by operation of the remote control of FIG. 3.
Figure 6B:
Figure 6C:
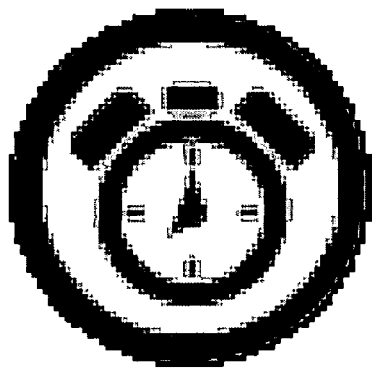
Figure 6D:

In the alternative, notification icons 500 are displayed with a border having the same color as the button 310 [FIG. 3] to which the notification message is associated. Other icons and notifications are possible, examples of which are shown in FIGS. 6A-D—a calendar notification icon (FIG. 6A), a memorandum trigger icon (FIG. 6B), a delete notification icon (FIG. 6C), and an alarm notification icon (FIG. 6D). The viewer is now in a position to read the notification at their leisure by pushing the colored button 310 on the remote control 300 whose color and relative position matches that of the displayed icons. Doing so will "action" the icon causing a dialog generated from the notification data to appear. This dialog may require further user input, in which case, the colored buttons are remapped to the dialog in the same manner as the previous mapping. Pressing a colored button 310 now will trigger the dialog, which may communicate the user selection to the source. This is dependant on what action the source has assigned to the dialog button in the notification data and will remove the notification from the list. This removal will of course cause a remapping of notifications to colored buttons, along with a subsequent redisplay of their icons.

Having described and illustrated the principles of the invention in a preferred embodiment thereof, it should be apparent that the invention could be modified in arrangement and detail without departing from such principles. We claim all modifications and variation coming within the spirit and scope of the following claims.

We claim:

1. A system for displaying an image of a broadcast stream on a display device comprising:
  a display coupled to a media processor and removable storage device;
  a wireless transmission device characterized by a remote control having a button operable to activate a display event;
  an encoder program operable on said media processor responsive to a single button press of the remote control to load at the display and to encode a digital media file for storage on the removable storage device from a broadcast stream received at the display; and a decoder program operable successively with said encoder program to decode said digital media file for viewing on the display.

2. The system of claim 1, wherein said encoder program is a JPEG encoder program, said digital media file is a jpeg image file, and said broadcast stream is a live television broadcast.

3. The system of claim 1, wherein the removable storage device is a PCMCIA card.

4. The system of claim 1, wherein said encoder program is a video encoder program, said digital media is a video image, and said broadcast stream is a live television broadcast.

5. The system of claim 4, wherein the removable storage device is a PCMCIA card.

6. A method for capturing an image for display on a display device comprising:

receiving a broadcast media signal at a display device;

receiving a wireless transmission signal at the display device generated from a remote control responsive to a single button press at the remote control;

loading an encoder program into a processor at the display device responsive to receiving the wireless transmission signal; and under direction of the encoder program loaded responsive to the received wireless transmission signal, automatically capturing a portion of the broadcast media concurrently with the loading step and storing a digital media file at the display device.

7. The method of claim 6, wherein the step of loading an encoder program includes the step of loading a JPEG encoder program and the step of capturing the portion of the broadcast media signal including capturing an image.

8. The method of claim 6, further including the steps of saving a frame from the broadcast media signal to a buffer, loading a second decoder into a second processor, and encoding the broadcast media signal at the second processor to form a second encoded stream.

9. The method of claim 8, further including the step of decoding the second encoded stream from a point forward measured from the frame saved to the buffer.

10. The method of claim 9, wherein the second encoded stream is an MPEG4stream.

11. A method for programming a television display operable in conjunction with a remote control device having a plurality of buttons associated with known output signals, the method comprising:

(a) receiving at the television display an assign signal from the remote control;

(b) allowing selection of an application function at the television display;

(c) receiving a programmable button signal from the remote control at the television display after selection of the application function, said programmable button signal resulting from a single programmable button press of the remote control; and (d) associating at the television display the selected application function with the programmable button signal received from the remote control, so that subsequent receipt at the television display of the programmable button signal results in operation of the application function and capturing an image or video of media transmitted to the television display.

12. The method of claim 11, further including the step of repeating steps (a) through (d) for each programmable button of the remote control, each programmable button signal being associated with a different application function.

13. The method of claim 11, wherein the application function is an image capture function.

14. The method of claim 12, wherein the application function is a video capture function.

15. The method of claim 13, further including loading a still image encoder program onto a media processor at the television and encoding a still image of a current live TV signal.

16. The method of claim 13, further including buffering broadcast content received at the television display to effect a time shift, removing under operation of the media processor the time shift responsive to receipt of the programmable button signal to revert to a live broadcast image, and capturing the live content image.

* * * * *